US006210700B1

(12) United States Patent
Valente et al.

(10) Patent No.: US 6,210,700 B1
(45) Date of Patent: Apr. 3, 2001

(54) ENHANCEMENT OF TRANSPLANT GRAFT SURVIVAL THROUGH NUTRITIONAL IMMUNOMODULATION WITH OMEGA-9 FATTY ACID DIETARY SUPPLEMENT THERAPY

(75) Inventors: John F. Valente; J. Wesley Alexander; Cora K. Ogle, all of Cincinnati, OH (US); Norman A. Greenberg, New Hope, MN (US)

(73) Assignees: Novartis Nutrition AG, Berne (CH); University of Cincinnati, Cincinnati, OH (US)

( * ) Notice: Subject to any disclaimer, the term of this patent is extended or adjusted under 35 U.S.C. 154(b) by 0 days.

(21) Appl. No.: 09/108,337

(22) Filed: Jun. 30, 1998

Related U.S. Application Data

(63) Continuation of application No. 08/783,636, filed on Jan. 14, 1997, now abandoned.

(51) Int. Cl.$^7$ .................................................. A61K 47/00
(52) U.S. Cl. .......................... 424/439; 424/442; 424/420; 424/283.1; 426/443; 426/601; 426/615
(58) Field of Search ..................................... 424/439, 442, 424/420, 283.1; 426/443, 601, 615

(56) References Cited

U.S. PATENT DOCUMENTS

| 4,981,844 | 1/1991 | Alexander et al. . |
|---|---|---|
| 5,055,446 | 10/1991 | Alexander et al. . |
| 5,231,085 | 7/1993 | Alexander et al. . |
| 5,612,060 | 3/1997 | Alexander . |

FOREIGN PATENT DOCUMENTS 704211   4/1996   (JP) .

OTHER PUBLICATIONS

The Importance of Lipid Type in the Diet after Burn Injury, Annals of Surgery, Alexander, et al., vol. 204, No. 1, Jul. 1986, pp. 1–8.

Low Protein Diets Improve Survival from Peritonitis in Guinea Pigs, Peck, et al., Annals of Surgery, vol. 209, No. 4, Apr, 1989, pp. 448–454.

Composition of Fat in Enteral Diets Can Influence Outcome in Experimental Peritonitis, Peck, et al. Annals of Surgery, vol. 213, No. 7, Jul. 1991, pp. 74–82.

High Protein Diets are Associated with increased Bacterial Translocation in Septic Guinea Pig, Nelson, et al., Nutrition, vol. 12, No. 3, 1996, pp. 195–199.

A New Model for Studying Nutrition in Peritonitis, Annals of Surgery, Alexander, et al., AQ1–18, vol. 208, No. 3, 1988, pp. 0082–0088.

Nutritional Immunomodulation Enhances Cardiac Allograft Survival in Rats Treated with Donor–Specific Transfusion and Cyclosporine, Transplantation, Levy, et al., vol. 60, No. 8, Oct. 27, 1995, pp. 812–815.

Haw, et al., Transplantation 60 (6) 570–7, 1995.

Levy, et al., Transplantation, vol. 60 (No. 8) 812–815 (1995).

Dietary omega–3 and omega–9 fatty acids uniquely enhance allograft survival in cyclosporine treated rats and donor–specific transfusion treated rats, Transplatation, vol. 65, 1304–1309, No. 10, May 27, 1998.

*Primary Examiner*—Geetha P. Bansal
(74) *Attorney, Agent, or Firm*—Hesna J. Pfeiffer

(57) ABSTRACT

An improved immunomodulatory therapy for enhancement of depressed host defense mechanisms and improving allograft survival rates comprising the use of omega-9 unsaturated fatty acids to alter the immune response associated with organ transplantation. It is administered optionally in conjunction with an immunomodulatory diet comprising arginine and its salts, or metabolic precursors of arginine, together with an immuno-suppressive treatment comprising the administration of cyclosporine or other immuno-suppressants and optionally, with or without a donor specific transfusion. An especially preferred source of the omega-9 unsaturated fatty acids is canola oil.

2 Claims, No Drawings

ENHANCEMENT OF TRANSPLANT GRAFT SURVIVAL THROUGH NUTRITIONAL IMMUNOMODULATION WITH OMEGA-9 FATTY ACID DIETARY SUPPLEMENT THERAPY

This application is a continuation of 08/783,636, filed Jan. 14,1997, now abandoned.

The U.S. Government has a paid-up license in this invention and the right in limited circumstances to require the patent owner to license others on reasonable terms as provided for by the terms of USPHS Grant HL 38479, awarded by National Institute of Health.

FIELD OF THE INVENTION

The present invention relates generally to therapeutic regimens for immunologically impaired individuals recovering from surgery, infection, burns and other trauma. More specifically, the invention relates to an immunomodulatory diet and immunosuppressive therapy for the enhancement of host defense mechanisms and prolongation of allograft survival.

BACKGROUND OF THE INVENTION

The physiological trauma that besets the human body as a result of surgery, cancer, intensive burns, radiation therapy and the like has a deleterious effect on the health of the individual in more ways than one. It is well known that patients recovering from such trauma and who are being therapeutically treated often have compromised host defense mechanisms. A damaged or reduced immune system can often lead to increased morbidity and eventual death as a result of infection and/or organ failure through rejection.

In a related case U.S. Pat. No 5,231,085 also to Alexander, the present applicants discovered novel immuno- modulatory compositions and methods which enhance host defense mechanisms which have been compromised and are deficient for one reason or another. The immunomodulatory compositions are composed of an amino acid such as arginine or ornithine that are used in the biosynthetic pathways of other polyamines, a nucleobase source and a combination of omega-3- and omega4-polyunsaturated fatty acids. The composition is administered enterally or modified for parenteral administration and is preferably used as a supplement to a complete nutritional diet meeting the complete daily caloric and vitamin requirements of the patient. The administration of these compositions restore damaged or compromised immune systems to their healthy state. The Alexander patent 5,231,085 is hereby incorporated by reference.

The immunomodulatory compositions of Alexander et. al. '085 are believed to decrease the damage caused by the inflammatory response through multiple immune functional pathways. These compositions, when administered to surgery patients during the early post-operative period have been shown to bring about a significant reduction in the length of the average hospital stay as well as a significant reduction in the number of wound complications.

U.S. Pat. No. 5,055,446, to Alexander and Peck, was premised on the realization that sepsis was treatable in part by diet; as was U.S. Pat. No. 4,981,844, also to Alexander and Peck. In the latter patent, linoleic acid was employed to provide 20% to 80% of the calories in a diet ingested for at least 10 days prior to an operative procedure, to provide resistance to infection following the surgery. It was reported that excessive dietary polyunsaturated linoleic acid influenced immunocompetence after burns; this was also shown to reduce the risk of infection after surgery. The U.S. Pat. No. 5,055,446 provided a method to improve immune response and survival during sepsis, also by diet composition, comprising optimizing the protein level in diet to form only about 4 to less than 10% of total calories, while also supplementing the diet with omega 3 and omega 6 fatty acids.

Other related cases include pending U.S. applications, attorney docket 610-7236, Ser. No. 08/611,144, filed Mar. 5, 1996, now abandoned; and attorney docket 610-7218, Ser. No. 08/452,550, filed May 25, 1995, now U.S. Pat. No. 5,612,060. Some of the subject matter in these applications is also disclosed in *Transplantation,* Vol. 60, 812–815, No. 8, Oct. 27, 1995, "Nutritional Immunomodulation Enhances Cardiac Allograft Survival in Rats Treated with Donor-Specific Transfusion and Cyclosporine", Levy and Alexander.

All of these disclosures are incorporated by reference.

It is also well documented that the administration of lipids such as those found in a number of common fish oils significantly reduce the degree of immune response to solid organ allografts leading to improved survival. In one study, fish oil supplementation reduced the number of rejection episodes of renal allografts during the first year postoperative by 60%. Omega-3-polyunsaturated fatty acids which are found in these fish oils in fact have several properties which suggest that they play a key role in the inflammatory response. They are known to be potent inhibitors of platelet aggregation, thrombus formation and appear to reduce small vessel arteriosclerosis. These effects are presumed to occur in part through the down regulation of TxA-2 production in multiple cell lines.

Catabolic states after major operation or multiple trauma result in weight loss, negative nitrogen balance, and immune dysfunction. Maintaining adequate nutritional support may be of critical importance for the successful recovery of surgical patients. Early postoperative enteral feeding, in particular, helps to ameliorate weight loss and to counteract the nitrogen losses in catabolic states after extensive surgical procedures. Furthermore, an arginine-omega-3 fatty acid and ribonucleic acid (RNA)—supplemented enteral diet has been reported to better overcome postoperative immune dysfunction and to improve clinical outcome after major surgery.

Arginine is essential during growth and may become essential in catabolic states. Supplementation of diet with arginine promoted wound healing and enhanced immune function in animals by decreasing the T-cell dysfunction associated with injury. Animal studies showed that arginine administration resulted in increased thymic size and cellularity, enhanced lymphocyte proliferation to mitogen and alloantigen, augmented macrophage and natural killer cell lysis of tumor targets, and increased lymphocyte interleukin-2(IL-2) production and receptor activity.

Alexander, et al., The Importance of Lipid Type in the Diet After Burn Injury, Ann. Surg. 1986; 204:1–8 demonstrated that administration of increasing doses of omega-3 fatty acids in the diet improved immune function in burned guinea pigs, probably through alteration of prostaglandin synthesis pathways from dienoic to trienoic prostaglandins. In another study, omega-3 fatty acid supplementation improved survival after burn injury, reduced postinjury infectious complications, and diminished immunosuppression secondary to transfusion.

Certain nutrients such as the semi-essential amino acid arginine, RNA, and omega-3 fatty acids may act pharmacologically on the immune system. These nutrients may improve host immune defenses. The specific nutrient substrates seem to act via different mechanisms.

Supplemental dietary arginine has thymotrophic properties and enhances the responsiveness of thymic lymphocytes to mitogens in normal and traumatized animals. Arginine augments cellular immunity, as shown by enhanced skin allograft rejection in normal mice, and improves delayed hypersensitivity responses as well as survival in burn animal model. Arginine supplementation of an enteral diet in post-operative cancer patients has been evaluated, and showed that dietary arginine supplementation improves mitogen-stimulated lymphocyte blastogenesis. Increased IL-2 production and up-regulation of IL-2 receptor activity on T cells have also been described.

SUMMARY OF THE INVENTION

The present invention comprises the use of omega-9 unsaturated fatty acids, especially as found in canola oil, high oleic acid sunflower oil, or olive oil, to inhibit the rejection response associated with organ transplantation. The omega-9 fatty acid is administered in conjunction with an immunomodulatory effective amount of arginine or its salts or metabolic precursors of arginine, in addition to other immunosuppressive treatment regimens for the enhancement of allograft survival and altered host defense mechanisms. Preferably, the person needing the dietary supplement is fed orally with the added omega-9 fatty acid containing oil or the methyl or ethyl ester of the omega-9 fatty acid. This can be combined with a therapeutic dosage form of cyclosporine, with the optional presence of a donor specific transfusion and/or lipids containing omega-3 and omega-6 polyunsaturated fatty acids.

DETAILED DESCRIPTION OF THE INVENTION

Allograft survival rates are dependant upon a wide variety of factors and can be enhanced as noted previously herein. Synergistic increases in the graft survival rates result from previously known treatments with an enteral immunomodulatory diet comprising arginine and fish oil and an immunosuppressive treatment comprising the administration of cyclosporin, with or without a donor specific transfusion The finding of this invention is that omega-9 fatty acids, especially as found in canola oil, olive oil, or high oleic sunflower oil, can be used to enhance transplant graft survival. The omega-9-monounsaturated fatty acids may be in free acid form or in a form suitable for the physiological supply of omega-9-unsaturated fatty acids, such as in triglyceride form, or as the methyl or ethyl ester forms. The omega-9 fatty acids particularly appropriate for use in the compositions of the invention include the C-18 fatty acids as found in such suitable sources as canola oil, high oleic sunflower oil, or olive oil. Canola oil as a dietary supplement souce of the omega 9 fatty acids is especially preferred.

The amount of omega-9-fatty acids to be used as a supplement will depend on the type of treatment, the subject to be treated and the like. When the subject to be treated is an adult person, a satisfactory immunomodulatory response is, in general, obtained with supplements which allow a daily supply of from about 5 to about 60 grams, preferably from about 5 to about 40 grams and most preferably from 20 to 40 grams of the omega-9-monounsaturated fatty acid, as calculated from the chosen oil.

The term "arginine" as used herein is intended to include, but not limited to arginine and metabolic precursors of arginine in free amino acid form or salt form. Though part of the arginine may be administered in protein form, the arginine content of proteins will in general be so low that the contribution of any added protein source to the arginine content of the composition of the invention can be ignored.

The amount of arginine supplied in the dietary supplement may vary within wide ranges, depending on the subject to be treated and his needs. Thus, where the subject to be treated is an adult person (typically of about 60 to 75 kg body weight) a satisfactory immunomodulatory response is, in general, obtained with compositions formulated to allow a daily administration of 3 to 40 grams, preferably 6 to 30 grams and most preferably 9 to 18 grams of arginine (in free amino acid form).

The patient can also has other diet supplementation, including vitamins, minerals, trace elements as well as additional nitrogen, carbohydrate and fatty acid sources. These can be added to the oral intake of the patient, or supplied in the form of a liquid complete nutritional diet so that it can be used as the sole source of nutrition supplying essentially all the required daily amounts of vitamins, minerals, carbohydrates, fatty acids and the like. When the patient is capable of taking a full oral diet, the active ingredients will be added as a supplement. Preferably diet compositions, as total feeding, provide an energy supply of from about 1000 to 3500 kcal/day, preferably 1500–2000 kcal/day. In practical effect, when this invention is employed, arginine can substitute about 2 % of the energy needs, and the omega-9 fatty acid as found in, e.g., canola oil, can be used to substitut 8–30% of the energy requirements.

Suitable nitrogen sources include proteins such as caseinates or protein hydrosylates. Suitable carbohydrate sources include various starches and maltodextrins while suitable fatty acid sources include the triglycerides.

The immunomodulatory compositions of the invention may be formulated in a manner suitable for parenteral or enteral administration. They are particularly appropriate for enteral use, such as oral administration and/or tube feeding. Such compositions are conveniently administered in the form of an aqueous liquid. The compositions of the invention suitable for enteral application are accordingly preferably in aqueous form or in powder form, whereby the powder is conveniently added to water prior to use. For use as tube feeding, the amount of water to be added will depend on the patient's fluid requirements and condition.

Graft survival rates are greatly increased when the diet is administered in conjunction with an immunosuppressive treatment comprising the additional administration of a dosage form which comprises cyclosporine or other immunosuppressants, optionally in the presence of canola oil with or without a donor specific transfusion.

Cyclosporine ($C_{62}H_{111}N_{11}O_{12}$) is a non-polar cyclic oligopeptide derived from the fungus *Tolypocladium inflatum* that exhibits immunosuppressive activity through the disablement of T-cells.

Donor specific transfusion is a known immunological procedure that has been used clinically for some time. Anticoagulated blood or bone marrow from the donor is either administered whole or is first fractionated into its cellular components using standard separation procedures such as centrifugation. The cells, either whole or fractionated, are then injected into the transplant subject together with a dose of cyclosporine which is given orally or may be injected intravenously. The dosage of cyclosporine may vary considerably according to the patient's body weight, metabolism, etc. but generally initial doses will range from about 5.0 to about 15.0 mg/kg per day. This will then change according to the patient's response. Intravenous doses are generally one-third (⅓) that of the oral doses. Without being bound to any theory, it is believed that the immunological response to donor specific transfusion and cyclosporine is not merely a passive response but is generated by proliferation of suppressive elements leading to an active reduction of alloreactive cells. Other immunosuppression drugs may be used in accordance with this invention, such as steroids, sirolimus, tacrolimus, rapamycin, azathioprene, and mycophenolate mofetil.

The following examples are provided in order to better describe and set forth that which the Applicant conceives his invention to be. It is recognized that minor variations or changes may be made with respect to the materials or procedures that are not disclosed herein. It is to be understood that to the extent any such changes do materially alter or modify the invention, they are deemed as falling within the spirit and the scope of the invention as recited by the claims that follow.

EXAMPLE 1

The following example shows the extent to which allograft survival was improved by the subsequent administration of an immunomodulatory diet together with the immunosuppressive therapy of the present invention in a Lewis rat cardiac transplant model.

Male ACI rats (Harlan Industries, Inc. Indianapolis, Ind.), weighing 250–300 grams serve as donors of whole blood for transfusion and cardiac allografts. Male Lewis rats weighing 250–300 grams are the recipients. All animals in the study are housed in individual steel cages under supervised conditions in a facility approved by the American Association for Accreditation of Laboratory Animal Care (AAALAC). Either standard rodent chow or the immunomodulatory diet and water are provided ad libitum. The immunomodulatory diet contain 2% or 5% of arginine. The amount of arginine in the rat chow is calculated as the amount related to total energy in the diet, to avoid confusion when the total energy a rat eats is compared to the total energy a human eats. The rat chow %'s can be extrapolated to the effective amount of this invention.

The standard diet which serves as the control consisted of a commercially available pelleted rodent chow Teklad® (Harlan Industries, Indianapolis, Ind.).

The donor specific transfusion procedure consists of anesthetizing male ACI rats with 60 mg/Kg pentobarbital that is injected intraperitoneally (i.p). Their blood is then anticoagulated systemically by injecting 100 units of heparin via the dorsal penile vein. Whole blood is collected by direct cardiac puncture and 1.0 ml. is transfused immediately into an anesthetized male Lewis rat recipient via the penile vein.

Cyclosporine (Sandoz Pharmaceuticals, East Hanover, N.J.) is obtained in a liquid concentrate and diluted with natural olive oil to a concentration of 5.0 mg/ml.

Heterotopic abdominal cardiac transplantation is performed using a modification of the method of Ono and Linsey (Improved Technique of Heart Transplantation in Rats, J. Thoracic Cardio. Surg. 55 1107–1112 (1969). Both donor and recipient animals are anesthetized with 60 mg./kg. pentobarbital prior to operation. Rejection of the grafts is determined by the loss of a palpable heartbeat and confirmed by laparotomy, the date of the transplantation being considered day 0. Grafts from animals that are rejected or dead are stored in buffered formalin to facilitate histologic confirmation of rejection if needed. Technical failure, which is death or graft loss within 72 hours of operation are excluded from the analysis as well as any animals whose time of rejection is indeterminate.

DST (1.0 ml whole ACI blood) is given with 10 mg/kg CsA on day -1 relative to transplant. CsA is also administered at 2.5 mg/kg/day on days 0–6. Diets are initiated on day -1 and continue indefinitely. Rejection is determined by daily palpation and confirmed by laparotomy. Treatment protocols, individual rejection onset times, mean rejection time and standard error are summarized below.

The recipients are divided into ten (10) different groups according to the diet and therapy received as indicated in Tables 1 and 2, following. Table 3 describes the fatty acid content as well as the oil composition. (HOS is sunflower oil). In Table 3, the fatty acid composition in the oils used is calculated as grams in a 100 gram diet; in contrast, the %'s given in Tables 1 and 2 are based on the % of total caloric intake.

The Tables 1 and 2 below disclose the survival rate for the respective groups in terms of the number of days of survival after Lewis heterotopic cardiac allografts are implanted. The number of rats in each group is shown by the number of survival day numerals in the column. All results are also expressed as the mean ± standard error of the mean (SEM) and statistical significance was determined by the Kruskal-Wallis test.

TABLE 1

Survival of Cardiac Allografts in Treatment Groups

| Diet | Immunosuppression | Survival (Days) | Mn Allograph Survival SE + days |
|---|---|---|---|
| 1 | Untreated | 5,7,7,7,7,8,8,8 | 7.1 0.78 |
| 2 | DST/CsA × 14 | 11,41,52,54,67,72,75 | 53.1 8.38 |
| 7 | 30% Corn Oil/DST/ CsA × 14 | 18,21,48,51,55,63,73,426* | 94.4 47.85 |
| 5 | 15% Fish Oil/DST/ CsA × 14 | 21,46,46,60,72,151, 280,417* | 136.6 49.86 |
| 8 | 30% Fish Oil/DST/ CsA × 14 | 7,15,24,33,34,40,70,72 | 36.9 8.35 |
| 6 | 15% Sunflower Oil/DST/ CsA × 14 | 26,37,38,40,43,48,74,428* | 91.8 48.28 |
| 9 | 30% Sunflower Oil/DST/ CsA × 14 | 40,56,76,271?,280&, 293&,294&,294& | 200.5 42.15 |

DST= 1 ml ACI whole blood IV at D-1
CsA 10 mg/k D-1/2.5 mg/kg DO ---->D13 (s.c.)
Treatment diet initiated at D-1
DO= Day Zero the day of transplantation
*Denotes animal still alive
?denotes animal died with functioning graft
&animals sacrificed for ICC & allo-MLR assays

TABLE 2

Survival of Cardiac Allografts in Treatment Groups

| Diet | Immunosuppression | Survival (Days) | Mn Allograph Survival SE + days |
|---|---|---|---|
| 1 | Untreated | 5,7,7,7,7,8,8,8 | 7.1 0.78 |
| 10 | DST/CsA × 7 | 9,11,11,14,16,18,20,34 | 16.6 2.82 |
| 11 | 30% Canola Oil/DST/ CsA × 7 | 9,10,54,118,201,258* | 108.3 42.26 |
| 12 | 15% Canola Oil/DST/ CsA × 7 | 7,11,77,202,204,254* | 125.8 43.98 |
| 13 | 8% Canola Oil/DST/ CsA × 7 | 41,48,48,54,107,125 280,417* | 70.5 14.67 |
| 14 | 8% Fish Oil/DST/ CsA × 7 | 40,40,45,48,48,129 | 58.3 14.21 |
| 15 | 15% 1/2 Sunflower Oil-1/2 Fish Oil DST/CsA × 7 | 39,42,58,69,85,167 | 76.7 19.37 |

DST= 1 ml ACI whole blood IV at D-1
CsA 10 mg/k D-1/2.5 mg/kg DO ---->D6 (s.c.)
Treatment diet initiated at D-1
DO= Day Zero the day of transplantation
*Denotes animal still alive

TABLE 3

TOTAL OIL % PER DIET

| DIETS | TOTAL OIL | OIL TYPE | N-9 | N-6 | N-3 |
|---|---|---|---|---|---|
| Control | 6.31 | Corn | 1.58 | 3.85 | 0.06 |
| Diet #1 | 6.32 | Corn | 1.58 | 3.86 | 0.06 |
| Diet #2 | 6.66 | Corn | 1.67 | 4.06 | 0.07 |
| Diet #3 | 6.32 | Corn | 1.58 | 3.86 | 0.06 |
| Diet #4 | 6.33 | Corn | 1.58 | 3.86 | 0.06 |
| Diet #5 | 5.03 | Fish | 1.41 | 0.55 | 1.78 |
|  | 1.3 | Corn | 0.33 | 0.79 | 0.01 |
| Sub Total | 6.33 |  | 1.74 | 1.34 | 1.77 |
| Diet #6 | 5.28 | HOS | 4.21 | 0.53 | 0.11 |
|  | 1.05 | Corn | 0.26 | 0.64 | 0.01 |
| Sub Total | 6.31 |  | 4.47 | 1.17 | 0.12 |
| Diet #7 | 13.81 | Corn | 3.45 | 8.42 | 0.14 |
| Diet #8 | 12.66 | Fish | 3.54 | 1.39 | 4.43 |
|  | 1.15 | Corn | 0.29 | 0.7 | 0.01 |
| Sub Total | 13.81 |  | 3.83 | 2.09 | 4.44 |
| Diet #9 | 13.22 | HOS | 10.58 | 1.32 | 0.26 |
|  | 0.6 | Corn | 0.15 | 0.37 | 0.01 |
| Sub Total | 13.82 |  | 10.73 | 1.69 | 0.27 |
| Diet #10 | 6.14 | Corn | 1.54 | 3.75 | 0.06 |
| Diet #11 | 13.59 | Canola | 7.88 | 3.53 | 1.36 |
| Diet #12 | 6.21 | Canola | 3.6 | 1.61 | 0.62 |
| Diet #13 | 2.92 | Canola | 1.69 | 0.76 | 0.29 |
|  | 0.27 | Corn | 0.07 | 0.16 | 0 |
| Sub Total | 3.19 |  | 1.76 | 0.92 | 0.29 |
| Diet #14 | 3.24 | Fish | 0.91 | 0.36 | 1.13 |
|  | 1.34 | Corn | 0.34 | 0.82 | 0.01 |
| Sub Total | 4.58 |  | 1.25 | 1.18 | 1.14 |
| Diet #15 | 2.82 | Fish | 0.73 | 0.29 | 0.92 |
|  | 2.62 | HOS | 2.1 | 0.26 | 0.05 |
|  | 0.98 | Corn | 0.25 | 0.6 | 0.01 |
| Sub Total | 6.22 |  | 3.08 | 1.15 | 0.98 |

The three oils enriched with either Omega-3, Omega-6 or Omega-9 fatty acids, at either 15% or 30% concentration (percentage of total energy), are used. Cyclosporin is given for 14 days. The concentrations of the different lipids make a difference; higher concentration 30% corn oil or sunflower oil is better than 15% corn oil or sunflower oil. However, 15% fish oil is better than 30% fish oil. The 30% sunflower oil diet which is highest in Omega-9 fatty acids (Oleic acid) gives the best results. Additional experiments are summarized in Table 2. Canola oil contains high levels of the Omega-9 fatty acids as well as some Omega-3 fatty acids in the form of linolenic acid. Because the practical considerations of using high doses of lipid as a supplement to free feeding people for a long period of time, a dose response curve is done with the canola oil and in addition, a lower dose of fish oil is given (8% of energy). In addition, a diet containing 15% of energy from lipids is studied whereby one half of the energy is from sunflower oil and one half from fish oil. In the set of experiments in Table 2, cyclosporin is given for only 7 days from the time of transplant (8 days total).

All the lipid diets show a striking prolongation of graft survival compared to the animals receiving the base diet without lipid supplements. In particular, the animals receiving 15% of their energy from canola oil (diet 12) have extraordinary survival with three of six animals still surviving with a beating heart. Also animals receiving a 30% sunflower oil (diet 9) develop permanent tolerance in over 50% of the animals. All of the diets were isonitrogenous and isocaloric and they varied only in the amount and type of fat in the diets.

What we claim is:

1. A method for improving survival after allograft heart, kidney or liver transplantation in human patients comprising the administration of C-18 omega-9 fatty acids, in an amount corresponding to about 8–30% of the energy requirements of said patients, being that supplied by a daily dosage of about 5 to about 60 grams of canola oil, high oleic sunflower oil, or olive oil in an immunomodulatory diet to said patients during immunomodulatory therapy, wherein said immunomodulatory diet further includes a supplement comprising arginine, vitamins, trace minerals, nitrogen, fatty acids and carbohydrates.

2. The method of claim 1 wherein said immunomodulatory therapy comprises the administration of cyclosporine in a concentration of from about 3 mg/kg to about 15 mg/kg.

* * * * *